April 19, 1938.  L. J. MAIETTA  2,114,656
WHEEL SUSPENSION FOR MOTOR VEHICLES
Filed June 30, 1937   2 Sheets-Sheet 1
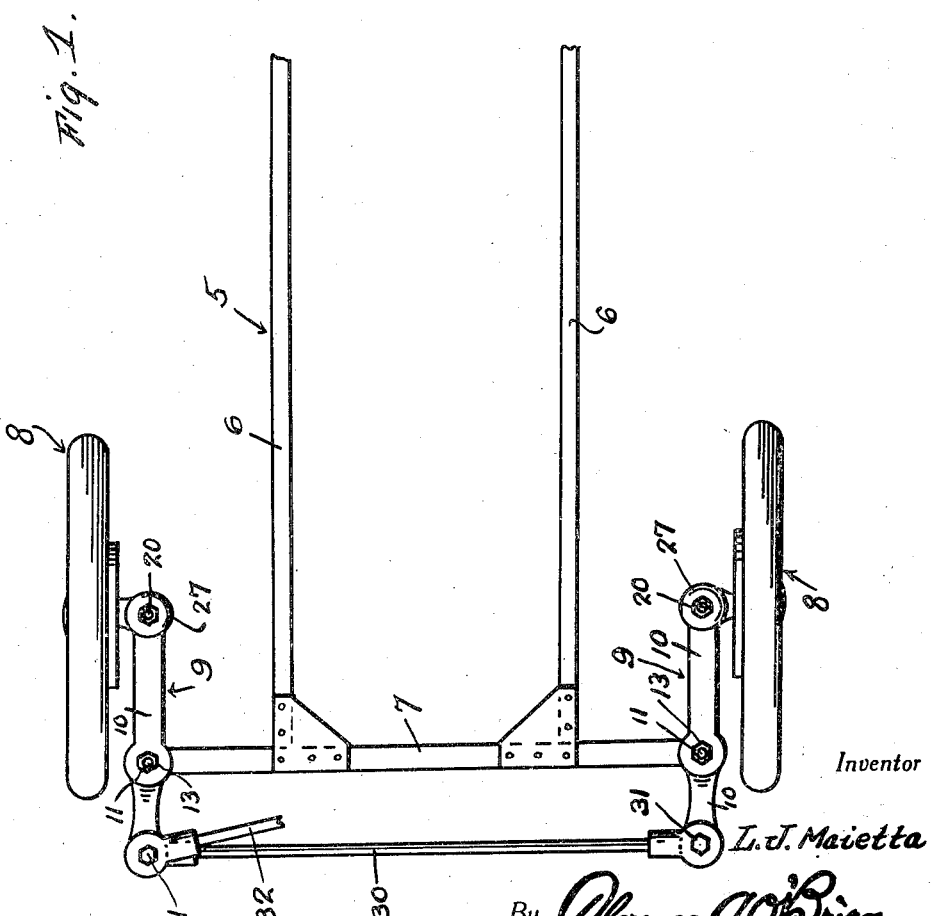
Inventor
L. J. Maietta
By Clarence A. O'Brien
Hyman Berman
Attorneys April 19, 1938. L. J. MAIETTA 2,114,656
WHEEL SUSPENSION FOR MOTOR VEHICLES
Filed June 30, 1937 2 Sheets-Sheet 2
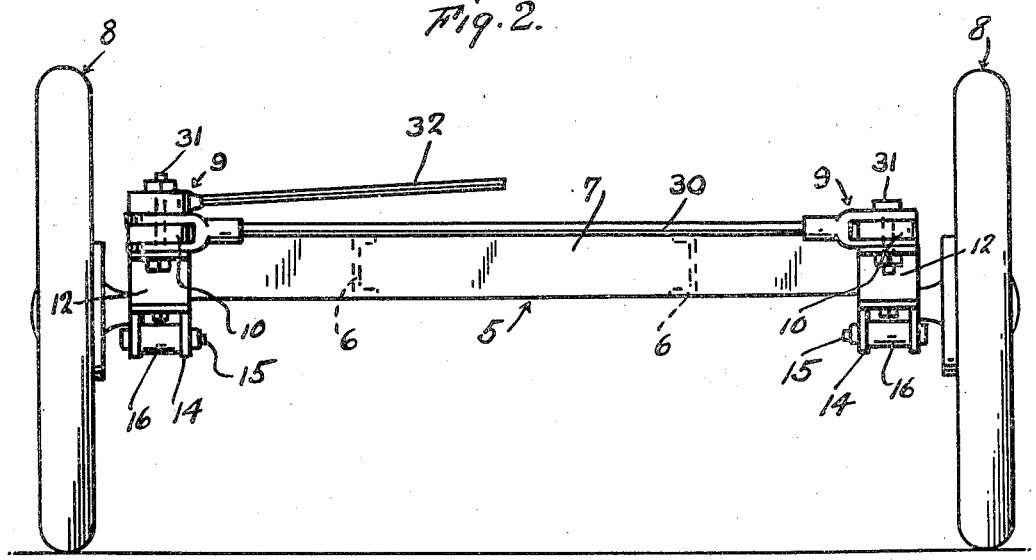
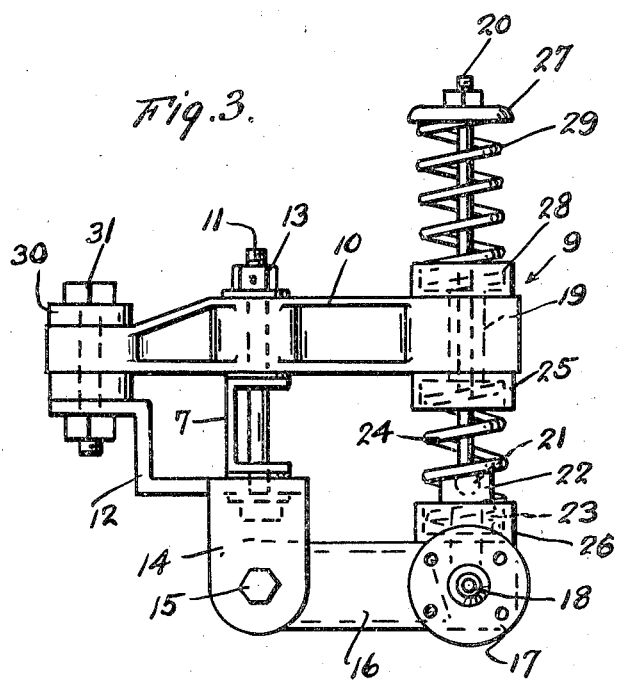
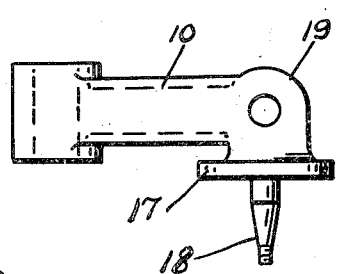
Inventor
L. J. Maietta Patented Apr. 19, 1938

2,114,656

UNITED STATES PATENT OFFICE 2,114,656

WHEEL SUSPENSION FOR MOTOR VEHICLES

Louis J. Maietta, Bristol, Conn.

Application June 30, 1937, Serial No. 151,268

3 Claims. (Cl. 280—96.2)

This invention relates to suspension means for the wheels of automobiles and an object of the invention is to provide an improved resilient suspension means for the front wheels of a motor vehicle.

A still further object of the invention is to provide for the suspension of the front wheels of an automobile in such a manner that the steering thereof will be much easier than is now the case; and whereby the use of leaf springs in the suspension of the front wheels of the vehicle is eliminated together with the undesirableness attending the use of such leaf springs.

The invention together with its objects and advantages will be best understood from a study of the following description taken in connection with the accompanying drawings wherein:—

Figure 1 is a top plan view illustrating my improved resilient front wheel suspension device.

Figure 2 is an elevational view of the suspension means for the front wheels of the vehicle.

Figure 3 is a side elevational view of a front wheel suspension device.

Figure 4 is a plan view of a spindle equipped arm.

Referring to the drawings by reference numerals it will be seen that in accordance with the present invention there is provided a vehicular frame or chassis 5 that includes a pair of relatively closely spaced side chassis bars 6 and a front chassis bar 7 that at its relatively opposite ends extends laterally beyond the side chassis bars 6.

Each of the front wheels of the automobile is indicated by the reference numeral 8, and for each front wheel 8 there is provided a resilient suspension device or assembly indicated generally by the reference numeral 9.

As best shown in Figure 3 each wheel suspension device 9 comprises an arm 10 supported intermediate its ends on the chassis bar 7 to swing horizontally through the medium of a pivot bolt 11.

The bolt 11 passes upwardly through an opening in one arm of a substantially Z-bracket 12 the flanges of the chassis bar 7, and an opening provided in an intermediate portion of the arm 10, bolt 11 being provided at its upper end with a nut 13.

The arm of the bracket 12 associated directly with the bolt 11 is provided with a pair of depending lugs 14 between which is pivoted as at 15 one end of an arm 16.

At the free end thereof arm 16 is provided at one side thereof with an integral disc 17 from which extends axially a spindle 18 on which a vehicular wheel 8 is mounted in an obvious manner. It will thus be seen that arm 16 is mounted to swing vertically up and down as may be occasioned by the vehicular wheel 8 riding over a raised construction or down into a depression in the roadway.

At one end thereof arm 10 is provided with a vertical opening 19 through which extends a suspension rod 20 which is of slightly less diameter than the opening 19 thus permitting the rod 20 to have a slight lateral play in all directions.

On the lower end thereof rod 20 is provided with a ball 21 conformably fitting within a socket 22 provided in a pin 23 threaded into the top of the arm 16 at the spindle equipped end of the arm.

Interposed between the last mentioned end of arm 10 and the spindle equipped end of arm 16 is a shock absorbing coil spring 24, the relatively opposite ends of which are accommodated in suitable cups 25, 26, of rubber or other suitable material.

On the upper end of the bolt or suspension rod 20 is a washer 27 between which and a cup washer 28 of rubber or other suitable material is interposed a coil spring 29 that serves to normally urge the bolt or suspension rod 20 upwardly and the arm 16 to a substantially horizontal position.

It will thus be seen that each device 9 provides a relatively simple yet efficient spring suspension means for a vehicle wheel 8.

The forward ends of the arms 10 of the suspension devices 9 are connected together by a single tie rod 30 pivoted at its respective opposite ends to said forward end of the arms 10 through the medium of bolts 31 which latter also serve to secure to the forward ends of the arms 10 one end of the brackets 12.

A steering rod, a portion of which is shown in Figure 1 and indicated by the reference numeral 32 is connected with the arm 10 of one of the devices 9 through the medium of one of the aforementioned bolts 31 as shown in Figure 3. It will thus be seen that as rod 30 is caused to move in either direction arms 10 will swing about the bolts 11 as pivots to swing the wheels 8 either to the right or to the left as the case may be for changing the direction of travel of the vehicle.

It is thought that a clear understanding of the construction, utility and advantages of an invention of this character will be had without a more detailed description.

Having thus described the invention, what is claimed as new is:—

1. In a wheel mounting for automobiles, a chassis frame comprising a pair of relatively closely spaced parallel side bars and a transverse front bar extending at its relatively opposite ends laterally from said side bars, arms pivotally mounted intermediate their respective ends on the front bar, bolts extending through said front bar and said arms and providing pivots about which said arms rotate, brackets associated with the lower ends of said bolts, wheel supporting arms pivoted at one end to said brackets, said wheel supporting arms having spindles extending laterally therefrom at the free ends of said wheel supporting arms, wheels mounted on said spindles, spring devices resiliently connecting the free ends of said wheel supporting arms with one end of the first mentioned arms, a tie rod connecting the free ends of the first mentioned arms, bolts pivotally connecting said tie rod with the last mentioned ends of the first named arms, said bolts also connecting said brackets to the last mentioned ends of the first named arms.

2. In a wheel suspension for automobiles, and in combination with a chassis frame member, an arm mounted on said frame member, a bolt extending through the frame member and the arm vertically, a bracket on the lower end of the bolt, a wheel supporting arm pivoted at one end thereof to said bracket and having a free end provided with a laterally projecting spindle, a vehicle wheel mounted on said spindle, a rod extending vertically through an opening in the first mentioned arm, and provided on its lower end with a ball, a socket member mounted on the free end of the wheel supporting arm and with which the ball of said rod is engaged, a spring disposed about said rod between the arms, a washer on the upper end of said rod, and a second spring disposed about the upper portion of said rod between the first mentioned arm and said washer.

3. In a wheel suspension for automobiles, and in combination, a chassis frame member, an arm mounted on said frame member for swinging movement in a horizontal plane, a bracket connected with and suspended from said arm, a wheel supporting arm pivoted at one end to said bracket, a resilient device connected with one end of the first named arm and the free end of said wheel supporting arm and including a rod movable vertically through an opening provided in said one end of the first named arm, and a ball and socket connection between the lower end of said rod and the said free end of said wheel-supporting arm, and a wheel spindle projecting laterally from the said free end of the wheel supporting arm.

LOUIS J. MAIETTA.